United States Patent
Biesheuvel (10) Patent No.: US 7,861,896 B2
(45) Date of Patent: Jan. 4, 2011

(54) ASSEMBLY OF A CONTAINER FILLED WITH MINERAL CONCENTRATE AND A DOSING DEVICE

(75) Inventor: Arend Cornelis Jacobus Biesheuvel, Werkendam (NL)

(73) Assignee: Sara Lee/De N.V., Utrecht (NL)

(*) Notice: Subject to any disclaimer, the term of this patent is extended or adjusted under 35 U.S.C. 154(b) by 976 days.

(21) Appl. No.: 10/557,864

(22) PCT Filed: May 24, 2004

(86) PCT No.: PCT/NL2004/000365

§ 371 (c)(1),
(2), (4) Date: Oct. 24, 2006

(87) PCT Pub. No.: WO2004/104527

PCT Pub. Date: Dec. 2, 2004

(65) Prior Publication Data

US 2007/0170212 A1    Jul. 26, 2007

(30) Foreign Application Priority Data

May 23, 2003  (NL) .................................. 1023521
Sep. 5, 2003  (NL) .................................. 1024237

(51) Int. Cl.
*B67D 7/76* (2010.01)
(52) U.S. Cl. .................. 222/190; 222/333; 222/504; 210/222
(58) Field of Classification Search ................ 222/190, 222/108, 129, 129.1, 185.1, 333, 504; 210/193, 210/222, 194; 417/417
See application file for complete search history.

(56) References Cited

U.S. PATENT DOCUMENTS 7,291,314 B2 * 11/2007 Paskalov et al. ....... 422/186.29
7,318,893 B2 *  1/2008 Biesheuvel et al. ......... 210/194

FOREIGN PATENT DOCUMENTS

| DE | 101 50 271 A 1 | 5/2002 |
| EP | 0 928 565 A1 | 7/1999 |
| GB | 2 103 296 A | 2/1983 |
| NL | 1019544 | 6/2003 |
| WO | WO 00/79223 | 12/2000 |

OTHER PUBLICATIONS

International Search Report and Written Opinion for PCT/NL2004/000365 dated Oct. 15, 2004.

\* cited by examiner

*Primary Examiner*—Frederick C. Nicolas
(74) *Attorney, Agent, or Firm*—Foley & Lardner LLP (57) ABSTRACT

An assembly (1) for preparing mineral water in situ, including a container (2) filled with a mineral concentrate (4) and a dosing device (6) connected to the holder for dispensing the concentrate from the container in a dosed manner, the dosing device being provided with a housing (15) including an inlet (16), an outlet (18), a liquid flow path (20), a pump (22), and a magnetizable or magnetic operating element (24). The operating element is being included in the housing for carrying out a predetermined movement relative to the housing with the aid of a changing magnetic field and the operating element is mechanically connected to the pump for driving the pump when the operating element carries out the predetermined movement. The operating element is manufactured, from corrosion resistant steel, or the operating element is provided with a corrosion resistant coating such as gold, silver or Teflon or the operating element is manufactured, from a magnetizable and/or magnetic ceramic material.

22 Claims, 6 Drawing Sheets

ABSTRACT OF A CONTAINER FILLED WITH MINERAL CONCENTRATE AND A DOSING DEVICE

ASSEMBLY OF A CONTAINER FILLED WITH MINERAL CONCENTRATE AND A DOSING DEVICE

FIELD

The invention relates to an assembly for preparing mineral water in situ comprising a container filled with a mineral concentrate and a dosing device connected to the container. The invention also relates to a dosing device as such.

For a long time, mineral water has been available to the consumer as an alternative to tap water. Many consumers prefer using such water which is available from, inter alia, the supermarket in bottles or cartons. Many mineral waters are offered in carbonated form, but non-carbonated variants are available too.

As a rule, the composition of mineral water differs from that of tap water. Mineral water contains a relatively higher concentration of dissolved salts than tap water. In addition, sometimes, in mineral water, salts are present which are not found in tap water. Due to the presence of those salts, mineral water has the image of being a healthy product.

Mineral water is also often offered in dosing devices for, for instance, offices. As a rule, those devices comprise a transparent storage reservoir for the water and a tapping location below which a glass or a mug can be placed. As a rule, known devices have two taps: one for water at room temperature and one for cooled water.

Offering mineral water via such dosing devices has different drawbacks. The storage reservoir also functions as refill package and is relatively heavy and, as a result, difficult to replace. As it is further important that the storage reservoir does not become empty too rapidly, it has a relatively large volume. This entails that when relatively little mineral water is taken from the device, this water can age, so that no fresh mineral water is available. When the mineral water is to be stored too long, microbial contamination can occur, which cannot only be disadvantageous to the flavour of the water but also to the health of the consumer.

In Dutch patent application 1019544, a device is proposed which does not have the drawbacks mentioned. This device generates mineral water from tap water, so that no relatively large storage reservoirs are required. In the device, tap water is first filtered, preferably with the aid of reverse osmosis, so that a purified product is obtained containing virtually no other components than water. Any salts and/or microorganisms that may be present in the tap water are virtually entirely removed through reverse osmosis. After filtration, the water is brought to the desired composition by mixing it with a mineral concentrate.

As no use is made of large storage reservoirs, there is little risk of the mineral water needing to be stored in this device too long. Problems with freshness will not, or hardly, occur, not even when little or no mineral water is taken from the device for a longer period of time. The mineral concentrate itself is dosed in the device from a refill package. Due to the high concentration of minerals in the concentrate, refilling will be required less often than in conventional devices in which a storage reservoir with ready product is to be replaced.

SUMMARY

The present invention relates to an assembly of a container filled with the mineral concentrate and a dosing device connected to the container which assembly can be used for making mineral water from filtered tap water, for instance in the device described hereinabove, from Dutch patent application 1019544.

An assembly according to the invention for preparing mineral water in situ comprising a container filled with a mineral concentrate and a dosing device connected to the container for dispensing the concentrate from the container in a dosed manner, has as a further property that the dosing device is provided with a housing comprising an inlet, an outlet, a liquid flow path, a pump and a magnetisable or magnetic operating element, the liquid flow path extending from the inlet to the outlet and the pump being included in the liquid flow path, while the operating element is included in the housing and is moveably connected to the housing for having the operating element carry out a predetermined movement relative to the housing with the aid of the changing magnetic field, the operating element being mechanically connected to the pump for driving the pump when the operating element carries out the predetermined movement while the operating element is manufactured, at least substantially, from corrosion resistant steel which is at least as corrosion resistant as corrosion resistant steel comprising molybdenum and at least titanium or niobium or that the operating element is provided with a corrosion resistant coating such as gold, silver or Teflon, or that the operating element is manufactured, at least substantially, from a magnetisable and/or magnetic, ceramic material.

Due to the special properties of the operating element, ions of the concentrate are prevented from reacting with the operating element while forming corrosion products which can contact the concentrate. If this were to happen, these corrosion products together with the concentrate could be mixed with the water for obtaining the mineral water. As a result, the flavour of the mineral water is adversely affected and, moreover, the mineral water obtains an unattractive colour. Also, oxidation products are prevented from being formed as a result of a reaction between oxygen and the material the operating element is at least substantially manufactured from, and from ending up in the mineral water. Moreover, such an assembly has as an advantage that filling the device with mineral concentrate as described in Dutch patent application 1019544 can be carried out in a simple manner. The container and the dosing device can then be fixedly or detachably connected to each other while the assembly is designed as a disposable product. Moreover, the container can be designed according to the so-called bag-in-box type, which has as an advantage that when the mineral concentrate is dispensed from the container, it needs not be aerated. The fact is that the flexible bag included in the container shrivels when the mineral concentrate is dispensed.

More in particular, it holds that the operating element is manufactured, at least substantially, from corrosion resistant steel comprising molybdenum and at least titanium or niobium.

Further, it holds in particular that the concentrate comprises a total salt concentration of at least 5, in particular 20 and more in particular 50 g per liter.

Preferably it holds that the concentrate comprises:
from 0.1 to 273 g of calcium ions per liter,
from 0.1 to 200 g of magnesium ions per liter,
from 0.1 to 583 g of chloride ions per liter, and
from 0.1 to 276 g of sulphate ions per liter,
  in such mutual ratios, optionally supplemented with other optional ions, that an electrically neutral product is obtained. According to this special variant of the assembly, what is achieved is that, on the one side, mineral water can be prepared with a desired flavour and that the concentrate and the operating element are geared to each other such that the operating element is (far) less subject to corrosion when it contacts the concentrate. Further, the mineral concentrate according to the invention has a particularly thought-out composition, so that after mixing with filtered tap water in the correct ratio, a product is obtained which is, as to flavour and composition, very similar to mineral waters known to consumers. Furthermore, a mineral concentrate according to be invention has such a composition that the concentrate has a long shelf life without unacceptable risks of a microbial contamination.

The total salt concentration of a mineral concentrate according to the invention will depend on the nature and amount of the ions present in the concentrate. It is important that the solubility product, under the storing and processing conditions of salts, which can be formed through combinations of cations and anions present in the concentrate, is not exceeded so that no precipitation is formed. It has appeared that it is not possible to simply multiply the concentrations of ions present in known mineral waters by a particular factor of at least 100, because then, certain salts will precipitate. Depending on the total composition of the concentrate, the skilled person will be able to select a suitable total salt concentration whereby, on the one hand, a product is obtained which can be processed to a mineral water in a simple manner, and, on the other hand, concentrations are achieved which are as high as possible in order that the concentrate takes up a volume which is as small as possible.

According to the invention, a mineral concentrate will preferably contain at least 10 g of salts per liter. This concentration refers to the added mass of all cations and anions present, while the mass of any crystal water that may be present in the salts used for preparing the mineral concentrate is not included. Preferably, the total salt concentration is over 20 g per liter, more preferably in the range of 30 to 40 g per liter. In order to arrive at a desired mineral water, a mixing ratio with filtered tap water of 25 to 500 liters of filtered tap water per liter of mineral concentrate is required.

A mineral concentrate according to be invention can be prepared by dissolving a selection of salts in water. Preferably, to this end, water is used which has been filtered in advance, most preferably with the aid of reverse osmosis. Salts from which a selection can be made include $NaCl$, $NHCO_3$, $Na_2CO_3$, $Na_2SO_4$, $Na_2SO_4.7H_2O$, $NaSiO_3$, $Na_3PO_4$, sodium lactate, $CaCl_2$, $Ca(HCO_3)_2$, $CaSO_4.2H_2O$, $CaSeO_4.2H_2O$, calcium lactate, calcium gluconate, $MgCl_2$, $Mg(HCO_3)_2$, $MgSO_4$, magnesium gluconate, magnesium lactate, $KCl$, $KHCO_3$, $K_2Mg(SO_4)_2$, $K_2Zn(SO_4)_2.6H_2O$, potassium gluconate, potassium lactate, $ZnCl_2$, $ZnSO_4$, zinc gluconate, $SiO_2$, $MnCl_2$, $MnSO_4$, manganese lactate, $Ag_2SO_4$, $AgNO_3$, cobalt gluconate, $FeSO_4.7H_2O$, $FeCl_2$, $FeCl_3.6H_2O$, iron gluconate, iron lactate, and $Li_2CO_3$. The amounts and nature of the salts will be selected in view of the desired composition of the mineral concentrate. When selecting that composition, the recommended daily amount (RDA) of each mineral can be taken into account. Also, the choice can be made to adapt amounts of certain minerals with regard to the target group of consumers of mineral water prepared with the mineral concentrate. For instance, it can be advantageous for certain regions to include relatively large amounts of magnesium, zinc and/or manganese ions, to mitigate deficiencies in those minerals.

Preferably, calcium ions are present in a mineral concentrate according to the invention in a concentration up to 100 g per liter, more preferably from 1 to 10 and most preferably from 4 to 7 g per liter. These amounts of calcium ions in a mineral concentrate provide a mineral water with a good, neutral flavour which drinks easily.

Preferably, magnesium ions are present in a mineral concentrate according to the invention in a concentration up to 20 g per liter, more preferably from 0.5 to 5 and most preferably from 1 to 4 g per liter. These amounts of magnesium ions in a mineral concentrate contribute to a somewhat bitter character of mineral water.

Preferably, chloride ions are present in a mineral concentrate according to the invention in a concentration up to 40 g per liter, more preferably from 5 to 30 and most preferably from 10 to 25 g per liter.

Preferably, sulphate ions are present in a mineral concentrate according to the invention in a concentration up to 240 g per liter, more preferably from 0.3 to 5 and most preferably from 0.8 to 3 g per liter. It has been found that these amounts of sulphate ions in a mineral concentrate may have a neutralizing effect on too expressive flavour effects of cations present.

Preferably, one or more ions more are present which have been selected from the group of sodium ions, potassium ions, zinc ions, manganese ions and bicarbonate ions.

Preferably, sodium ions are present in a mineral concentrate according to the invention in a concentration up to 142 g per liter, more preferably from 0.1 to 60 and most preferably from 0.5 to 10 g per liter.

Preferably, potassium ions are present in a mineral concentrate according to the invention in a concentration up to 173 g per liter, more preferably from 0.1 to 60 and most preferably from 0.2 to 5 g per liter.

Preferably, zinc ions are present in a mineral concentrate according to the invention in a concentration up to 2072 g per liter, more preferably from 0.1-6 and most preferably from 0.3 to 2 g per liter.

Preferably, manganese ions are present in a mineral concentrate according to the invention in a concentration up to 350 g per liter, more preferably from 0.1 to 2 and most preferably from 0.2 to 1 g per liter.

Preferably, bicarbonate ions are present in a mineral concentrate according to the invention in a concentration of 0.1 to 240, more preferably of 3 to 150 g per liter.

Other ions that may be present are iron (II), iron (III), cobalt, lithium, nitrate, carbonate, citrate, lactate, gluconate, phosphate, hydrogen phosphate, dihydrogen phosphate, silicate, hydrogen sulphate and the like.

With the total salt concentration in the range of 30 to 40 g per liter, the operating element still has the property that it will not corrode under the influence of such a salt concentration.

A good guarantee against corrosion is preferably obtained when it holds that the amount of molybdenum in the corrosion resistant steel is between 0.8 and 4% by weight.

Also, it preferably holds that the amount of titanium plus niobium in the corrosion resistant steel is between 0.2 and 1.2% by weight.

Preferably, it holds that the operating element comprises corrosion resistant steel of the ferritic, martensitic, martensitic-ferritic or the duplex type.

A particular embodiment of the assembly according to the invention has as a characteristic that the housing is of elongated and, preferably, cylindrical design, while the pump is provided with a bellows element compressible in axial direction of the housing by the operating element and expandable in axial direction through bias, which bellows element defines a pumping volume, and two rigid, hollow cylindrical valve bodies interconnected by means of the bellows element and supporting the bellows element radially outwards during a pumping stroke against form changes, the pump being provided with an entrance with a check valve and an exit, while the entrance is in fluid communication with the inlet and the pump volume enclosed by the bellows element and the exit is in fluid communication with the outlet and the pump volume enclosed by the bellows element, the operating element being of annular design and connected to the housing so as to be moveably in axial direction for compressing the bellows element in axial direction. In this manner, it is possible to dispense a predetermined amount of concentrate in a highly accurate manner.

According to an alternative embodiment of the assembly according to the invention, it holds that the operating element is provided with a rotor connected to the housing so as to be rotatable about a rotation axis, for having the rotor rotate about a rotation axis with the aid of the changing magnetic field, while the rotor is mechanically connected to the pump for driving the pump with the rotating rotor. In this embodiment of the assembly too, it proves possible to dispense a predetermined amount of concentrate in a highly accurate manner.

The dosing device according to the invention is characterized in that it is provided with a housing comprising an inlet, an outlet a liquid flow path, a pump and a magnetisable or magnetic operating element, the liquid flow path extending from the inlet to the outlet, and the pump and the metal operating element being included in the liquid flow path while the operating element is movably connected to the housing for having the operating element carry out a predetermined movement relative to the housing with the aid of a changing magnetic field, the operating element being mechanically connected to the pump for driving the pump when the operating element carries out the predetermined movement, the operating element being manufactured, at least substantially, from corrosion resistant steel which is at least as corrosion resistant as a corrosion resistant steel comprising molybdenum and at least titanium or niobium and/or that the operating element is provided with a corrosion resistant coating such as gold, silver or Teflon.

BRIEF DESCRIPTION OF THE DRAWINGS

The invention will presently be further elucidated with reference to the drawing.

In the drawing.

DETAILED DESCRIPTION

Figure 1:
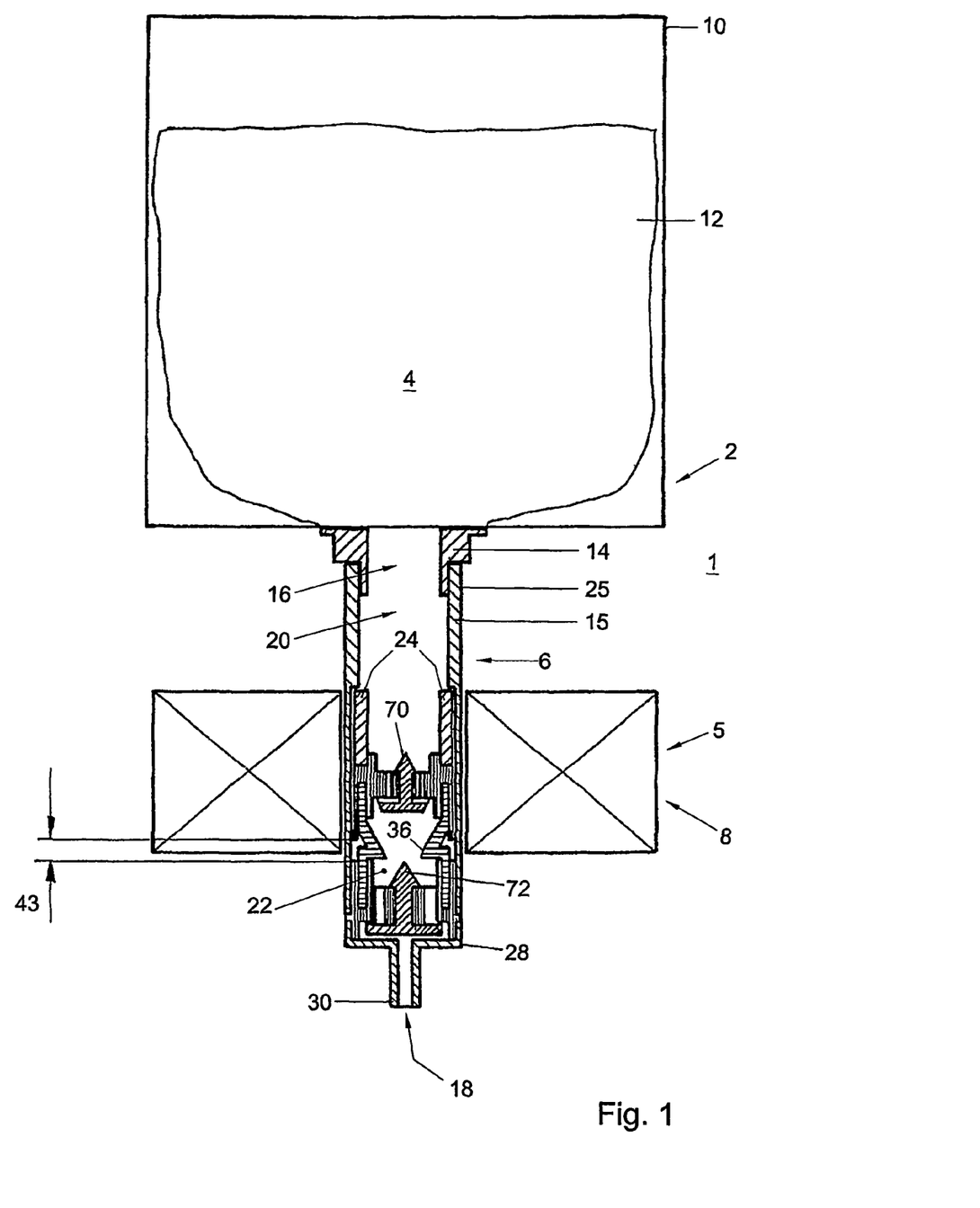
FIG. 1 shows a first embodiment of an assembly according to the invention the dosing device of which is included in a device for generating a varying electromagnetic field.

In FIG. 1, with reference numeral 1, an assembly is indicated for preparing mineral water in situ, comprising a container 2 filled with a mineral concentrate 4 and a dosing device 6 connected to the container for dispensing the concentrate from the holder in a dosed manner. Also in FIG. 1, a device 8 is shown for generating a varying electromagnetic field for the purpose of controlling the dosing device 6.

Preferably, the container 2 is intended to be used once and serves for storing, transporting, and dispensing in a dosed manner. Preferably, the dosing device 6 is permanently connected to the container and is disposed of together with the container. Therefore, a mass-article is involved here.

The container can consist of an external sleeve and an internal, liquid receiving, flexible bag which shrivels when dispensing. In that case, aerating the container for the purpose of dispensing is not required. However, the container can also be designed to be virtually rigid and be provided with an aerating device to be operated for the purpose of dispensing.

Further, the container is preferably intended for receiving, storing and transport.

In the example according to FIG. 1, the container 2 consists of an external sleeve 10 and a flexible, shriveling bag 12 in which concentrate is included. It is provided with a nozzle 14 to which the dosing device 6 is attached, preferably in a permanent manner. The bag is filled with the mineral concentrate for preparing mineral water in situ. In FIG. 1, the container is represented upside down, which position is taken up when the mineral concentrate is disposed in a dosed manner. In this position, the dosing device 6 is included through a central opening of an electromagnetic ring coil 5 of the device 8. The device 8 is, for instance, fixedly built-in in a beverage machine for dispensing mineral water. The beverage machine then adds, for instance, to a predetermined amount of filtered tap water, a dosed amount of mineral concentrate 4 for preparing mineral water. Such a device is described in Dutch patent application 1019544.

The electromagnetic ring coil 5 is connected to an associated control device allowing, for instance, the electromagnetic ring coil 5 to be energized with the mains frequency, while the number of vibrations the ring coil 5 is to follow can be set on the control device. At each vibration, a predetermined amount of concentrate is dispensed. The total amount of vibrations therefore determines the size of the amount of concentrate which is dispensed.

The dosing device 6 is provided with a housing 15, comprising an inlet 16 and outlet 18. In the housing, a liquid flow path 20 extends from the inlet 16 to the outlet 18. In the liquid flow path 20, a pump 22 to be further described is included as well as a magnetisable or magnetic operating element 24. The pump 22 is included in the liquid flow path. The operating element is included in the housing 15 and moveably connected to the housing 15 for having the operating element carry out a predetermined movement relative to the housing with the aid of changing magnetic field generated by the device 8. The operating element 24 is mechanically connected to the pump 22 for driving the pump when the operating element performs the predetermined movement.

Figure 2:
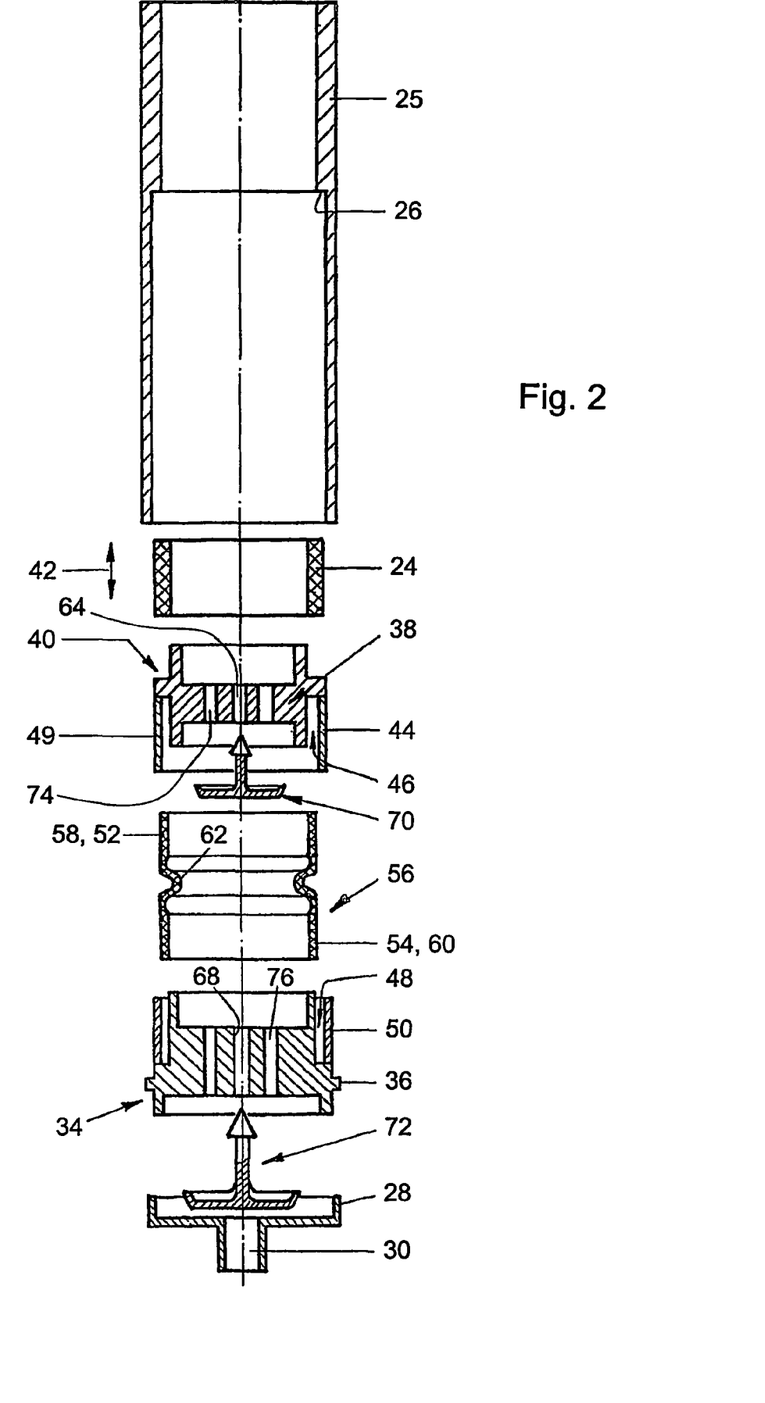
FIG. 2 shows the dosing device of FIG. 1 with disassembled parts.

More in particular it holds that the housing comprises a rigid guide tube 25 of plastic which, by its upper end, is fixedly or detachably connected to the nozzle 14 of the container. Over the larger part of its length, from a shoulder 26 (FIG. 2), the internal cross section of the guide tube 25 is widened. Below the guide tube 25, a rigid lid 28 is provided having an outlet stub 30 in its middle. In the example represented, both parts 25 and 28 are interconnected by means of a hub-shaped valve body 34, provided at its circumference with an annual flange 36 forming a stop for the ends of the guide tube 25 or the closing lid 28, respectively, upon its (sliding)

provision on the valve body 34, which is thus connected to the guide tube 25 and the closing lid 28.

A second, similar hub-shaped valve body 38 is included with clearance in the other part of the guide tube 25, so that it can move freely therein in axial direction. On the end of the valve body 38, made of plastic, facing upwards to the container 2, a magnetisable sleeve forming the operating element 24 (annular operating element) 24 in the shape of ring armature is fixedly provided, while the lower annular end of the sleeve abuts against a shoulder 40 of the valve body 38. In this manner, the valve body 38 and the ring armature 24 form a composite part which can be moved upwards and downwards in axial direction in the guide tube 25 according to the double arrow.

The ends of the valve bodies 34, 38, facing each other, are provided with receiving or attachment parts 44, 46, or 48, 50, respectively, for the bush-shaped ends 52, 54, respectively, of a hollow, cylindrical body 56 forming a bellows element. In the example shown, body 56 is of a resilient material. The body 56 comprises thickened end parts 58 and 60 for attachment to the two valve bodies 34 and 38, as well as a thinned and a radially inward facing fold 62. Due to the connection of the hub-shaped valve bodies 34 and 38 via the body 56, a predetermined dosing volume is enclosed between these parts in the body 56. The output size of this volume is determined by the reset action of the body 56, together with the internal shoulder 26 of the guide tube 25, against which the upper annual end surface of the operating element 24 abuts in the position of rest.

In the example shown, each valve body 34, 38 respectively, is provided with a central bore 64, 68, respectively, in each of which the stem of a mushroom-shaped valve element 70, 72, respectively, consisting of resilient material, can be attached through snap action. The conical thickening at the end of the stem fixedly connects the valve element to the hub-shaped valve body. Due to the pressure changing, the lip-shaped circumferential edge of the disk-shaped head of the valve element 70, 72, respectively, comes to lie in a sealing manner against the inner end surface of the hub-shaped valve body 34, 38, respectively. In the central area thereof, a series of through bores 74, 76, respectively, are provided, distributed in a crownwise manner, via which bores the liquid can enter into the dosing space or flow therefrom, respectively. The elastic bias of the material of the mushroom-shaped valve element 70, 72, respectively, is sufficient to prevent liquid from flowing away, under static conditions, through the bores 74, 76, respectively. Only when, in addition to the static condition, superposed pressure changes occur, the lip-shaped circumferential edges of the disc-shaped heads of the valve elements 70, 72, are pressed away from the inner end surface of the hub-shaped valve body 34, 38 respectively and allow liquid flow.

In upward direction, the stroke of the composite part consisting of the valve body 38 and the ring armature 24 is defined by the shoulder 26 in the guide tube 25. In downward direction, the stroke of this part is defined in that, with downward movement, the lower end edge of the casing 49 of the hub-shaped valve body 38 strikes against the top annular end edge of the casing 50 of the hub-shaped valve body 34. Through the selection of the length of the casings 49 and 50, with the build-up unchanged, the length of stroke 43 (see FIG. 1) of the movable unit 24, 38 can be easily changed and accurately set. When the valve bodies 34 and 38 are moved towards each other, the casings 49, 50 confine the hollow cylindrical body 56 on the outside such that the body 56 cannot expand radially outwards.

FIG. 1 shows the parts in, approximately, the actual size of a preferred embodiment, while in practice, the length of stroke is selected to be rather smaller than is represented in FIG. 1. The amount of mineral concentrate flowing from the connecting stub 30 is determined by the number of pumping strokes occurring with the mains frequency. This amount can be accurately set in that the volume dispensed at each pumping stroke can be highly accurately set also with a very limited magnitude. In the dispensing part, the liquid is hermetically screened off from the influence of oxygen from the air. The stroke limitation can also be obtained by other stop parts, provided, for instance, in the guide tube.

In order to also prevent radial form changes of the hollow, cylindrical body 56 in the area of the fold 62 projecting radially inwards, it is advantageous to provide a rigid support at the or each fold at the location of its inwardly facing top.

It can also be particularly advantageous when the top of the fold proceeds helically. In that case, the top can be provided with a spring element as supporting element, extending helically and compressible only in axial direction, which also serves for biasing the hollow cylindrical body 56 in axial direction. This, then, needs not be resilient in itself, provided that it consists of sufficiently flexible material.

Under certain conditions, the check valve 72 at the exit side can be omitted. For replacing the check valve 72, the space enclosing the pump volume is provided at the exit side with an outlet stub, which is in open communication with the pump volume. The inside width and length of this outlet stub are selected such that, with unchanged and with increasing pump volume, the internal friction and the surface tension of the concentrate in the outlet stub are sufficient for retaining the concentrate column in the outlet stub without axial displacement. The condition with the pump volume unchanged, is the condition in which the check valve 72 is closed at the entrance side. With increasing pump volume, concentrate is sucked from the container into the pump volume.

With practical embodiments of the device in this embodiment, the inside width of the pump volume was between 8 and 12 millimetres. The length of stroke could be set between 1 and 2 mm. The stroke frequency was 50 Hz, but could be changed between 10 Hz and 100 Hz, without disturbing the functioning. Liquids with viscosities between 1 and 100 units (centipoise) were tested. As passage openings, the check valve 70 at the entrance side had grooves lying in a semicircle which could be covered by valve plates. It was determined that with a length of the outlet stub 30 replacing the outlet valve 72 of between 10 and 40 mm and inside width of this outlet stub between 1-3 mm, no concentrate dripped out.

Without the corset-shaped support of the bellows 56, irregularly, form changes of the bellows occur, which influence the dosing accuracy. By contrast, with the corset-shaped support, tolerances as to volume of hardly measurable size could be maintained.

As the container 2 is filled with a mineral concentrate which, when it were to contact the operating element 24, could give rise to corrosion, it further holds that the operating element is manufactured, at least substantially, from corrosion resistant steel which is at least as corrosion resistant as a corrosion resistant steel comprising molybdenum and at least titanium or niobium and/or that the operating element is provided with a corrosion resistant coating such as gold, silver or Teflon. With this, the risk of corrosion is reduced considerably.

Preferably, it holds that the operating element is manufactured, at least substantially, from corrosion resistant steel comprising molybdenum and at least titanium or niobium.

Preferably, it further holds that the operating element comprises corrosion resistant steel of the ferritic, martensitic, the ferritic-martensitic or the duplex type (more than one structure, for instance ferrite in addition to austenite).

In particular, it holds that the amount of molybdenum in the corrosion resistant steel is between 0.8 and 4% by weight, more in particular it holds that the amount of molybdenum in the corrosion resistant steel is between 1 and 3% by weight, and even more particularly it holds that the amount of molybdenum in the corrosion resistant steel is between 1.7 and 2.5% by weight.

Preferably, it further holds that the amount of titanium plus niobium in the corrosion resistant steel is between 0.2 and 1.2% by weight.

More preferably, it holds that the amount of titanium plus niobium in the corrosion resistant steel is between 0.3 and 1.0% by weight.

Still more preferably, it holds that the amount of titanium plus niobium in the corrosion resistant steel is between 0.4 and 0.6% by weight.

With such particular embodiments it appears that, even if the operating element contacts the mineral concentrate, corrosion of the operating element, which corrosion can adversely affect the flavour of the mineral water to be prepared, cannot be prevented to such an extent. Further, it holds in this example that the corrosion resistant steel is substantially nickel free, however, this is not required.

Therefore, the fact that the operating element is included in the liquid flow path, as is the case in the present embodiment, is not a problem.

In particular, it further holds that the concentrate comprises a total salt concentration of at least 5, in particular 20 and more in particular 50 grams per liter.

More in particular, it holds that the concentrate comprises:
from 0.1 to 273 grams of calcium ions per liter,
from 0.1 to 200 grams of magnesium ions per liter,
of 0.1 to 583 grams of chloride ions per liter, and
of 0.1 to 276 grams of sulphate ions per liter, in mutual ratios such, optionally supplemented with other, optional ions, that an electrically neutral product is obtained.

Preferably, a mineral concentrate has a pH within the range of 1-5, more preferably 2-4. It has been found that with such acidities, the shelf life of a mineral concentrate is considerably increased, while there is hardly any adverse effect or no adverse effect on the flavour of the mineral concentrate obtained after mixing the mineral concentrate with filtered tap water. In order to obtain the desired pH, use can be made of one or more of the following acids: phosphoric acid, hydrochloric acid, sulphuric acid, lactic acid, citric acid, ascorbic acid, malic acid, tartaric acid and acetic acid. In a preferred embodiment of the invention, the pH of the mineral concentrate is buffered around the desired pH. To this end, lactate, citrate or gluconate buffers can be used.

In this example, the operating element 24 is manufactured entirely from the respective corrosion resistant steel. All other parts of the dosing device are manufactured from a plastic materials such as PVC.

However, it is also possible that the operating element is manufactured from magnetisable and/or magnetic material which is provided with a corrosion resistant coating such as gold, silver or Teflon. A specific example of the corrosion resistant steel used involves Uginox f 18 mt (1.4521). This comprises 0.02% C, 0.4% SI, 0.4% Mn, 17.7% Cr, 2.1% Mo, 0% Ni, and 0.45% Ti+Nb. Here, a corrosion resistant steel of the ferritic type is involved. It is possible, too, to use a corrosion resistant steel of the duplex type. For instance, steel 1.4462 can be considered. This steel is provided with 0.02% C, 0.5% Si, 1.7% Mn, 22.5% Cr, 3.2% Mo, and 0.15% of other materials. Materials used in a refrigerator as a magnetic strip and/or magnetisable ceramic materials can be considered too.

In FIGS. 3-6, with reference numeral 100, a second embodiment of an assembly according to the invention is indicated. The assembly comprises a container 10 as described with reference to FIGS. 1-2. The assembly further comprises a dosing device 100 provided with an inlet 102 and at least one outlet 104.

Figure 3:
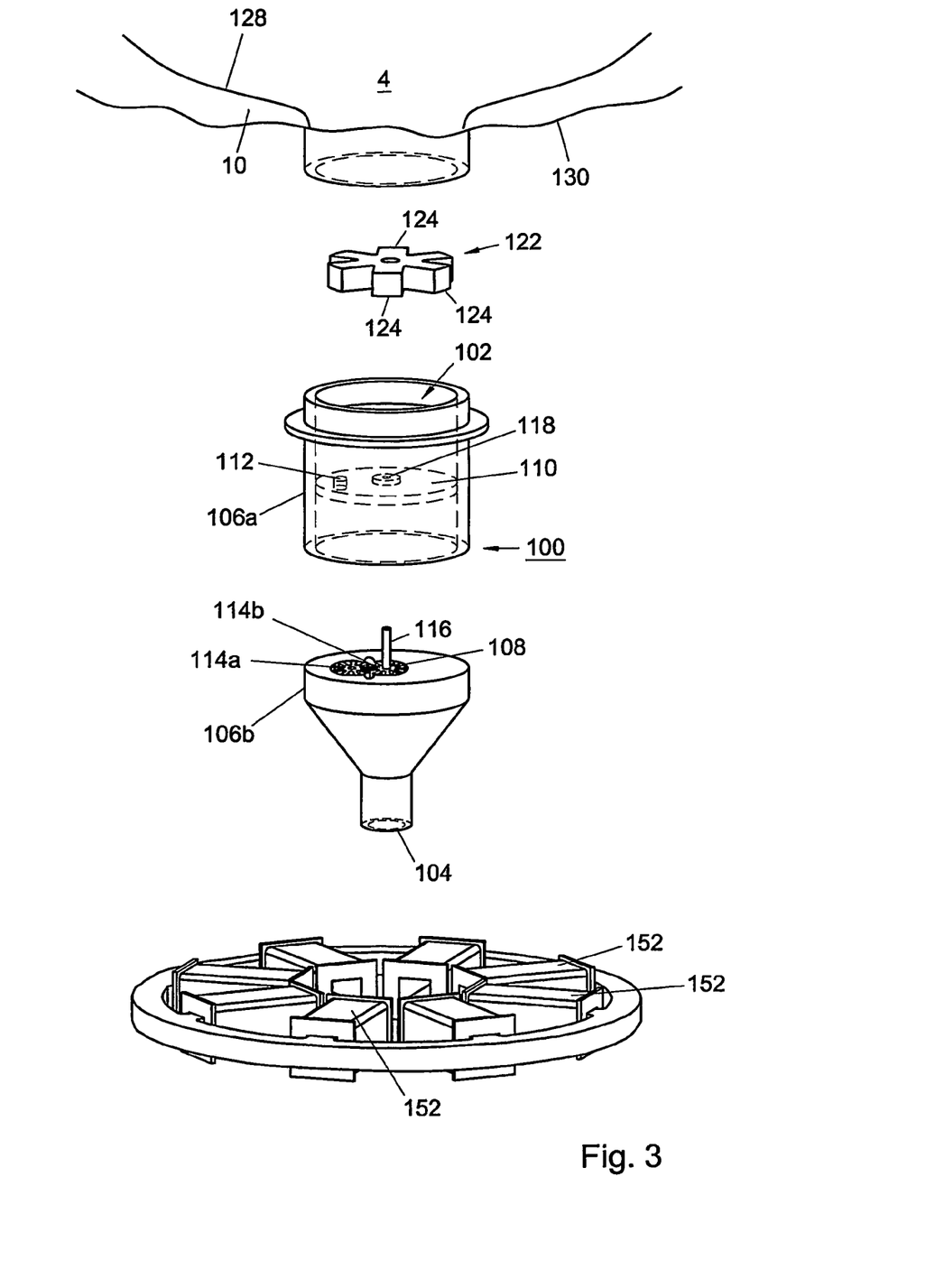
FIG. 3 shows a second embodiment of an assembly according to the invention together with a device for generating a changing magnetic field.

The liquid flow path extends from the inlet 102 to the outlet 104. In this example, the dosing device is provided with a housing comprising two parts 106a and 106b, designed so as to be rotation-symmetrical about an axis facing in the direction of the liquid flow path.

Figure 4:
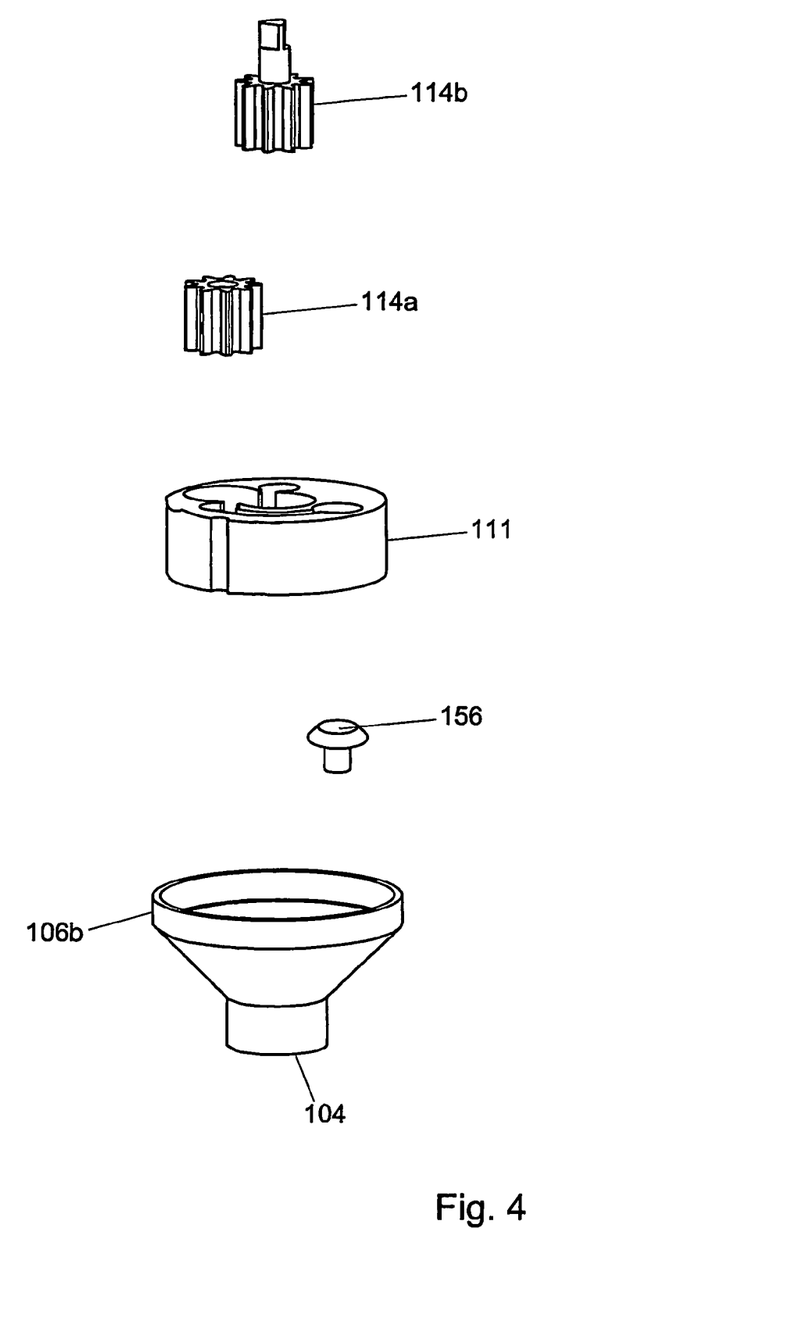
FIG. 4 shows a number of parts of the dosing device according to FIG. 3.
Figure 5:
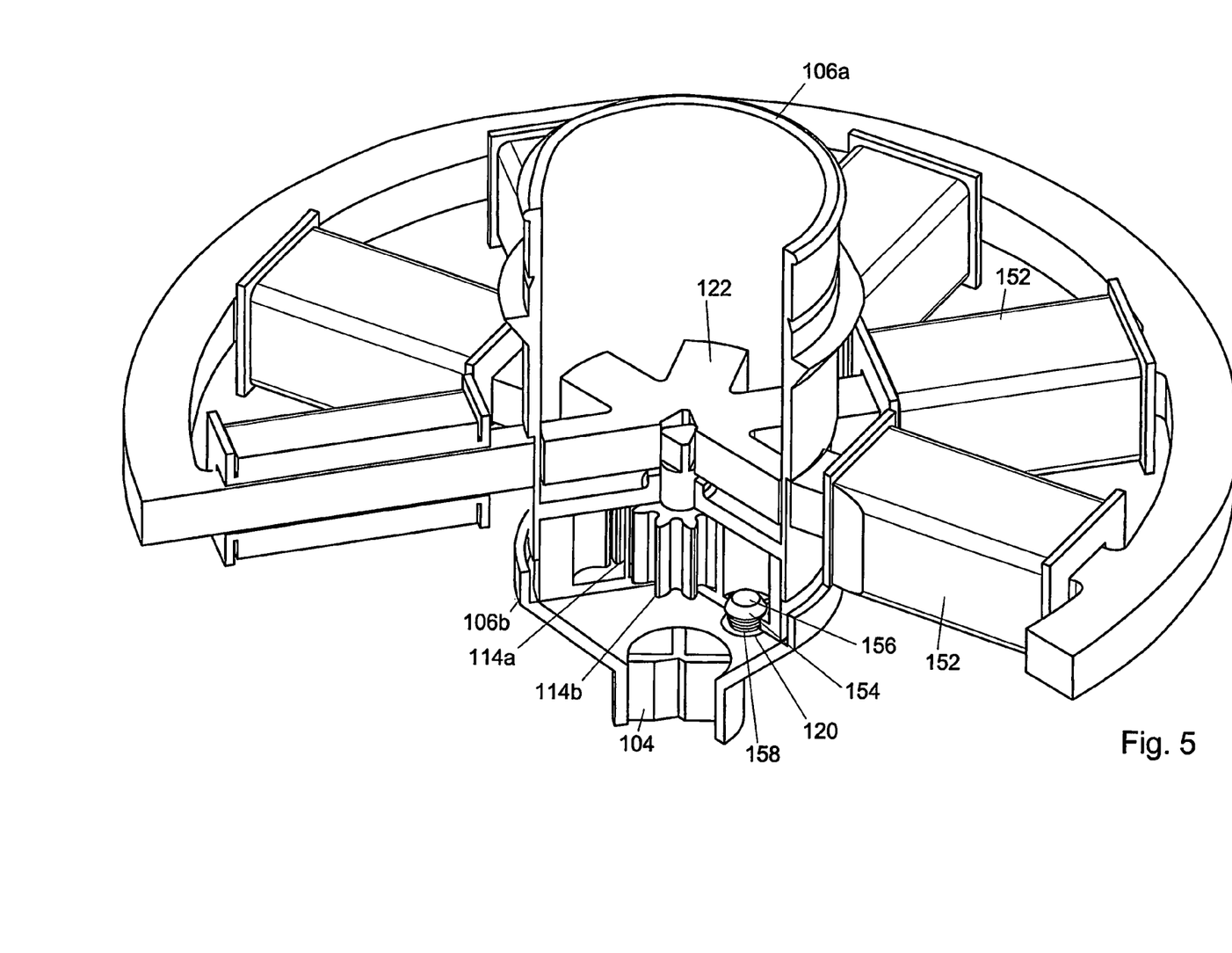
FIG. 5 shows a number of parts of the dosing device and the device for generating a varying magnetic field according to FIG. 3.
Figure 6A:
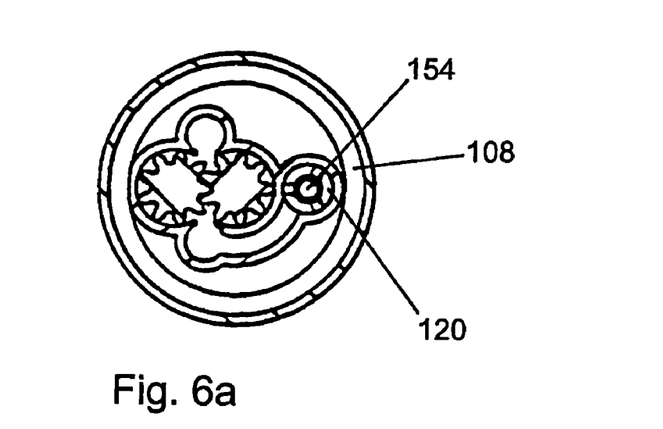
FIG. 6a shows a top plan view of the gear pump of the dosing device according to FIG. 3.
Figure 6B:
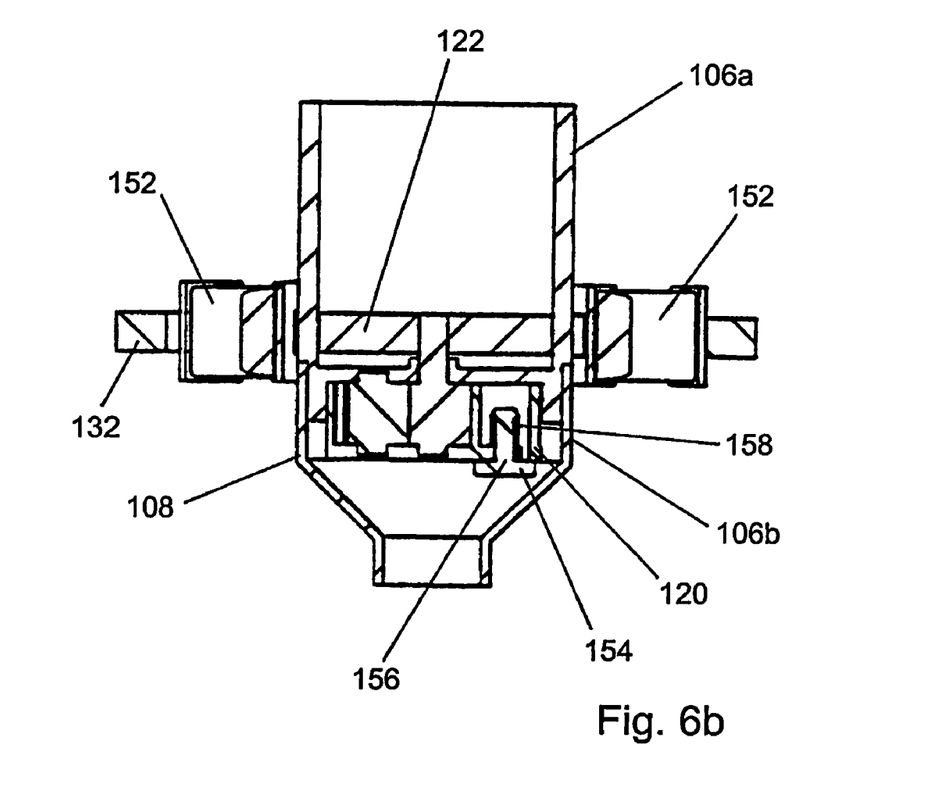
FIG. 6b shows a cross section of the dosing device according to FIG. 3 included in a magnetization unit according to FIG. 3.

In the housing 106a, 106b, a pump 108 is included. Here, the pump 108 is designed as a gear pomp. At its upper side, the gear pump 108 is provided with a cover plate 110 with an inflow opening 112. The inflow opening 112 is in fluid communication with a space in a block 111 where the teeth of the, in this case two, gears 114a and 114b intermesh. The gear 114b is driven by a driven shaft 116 extending, in mounted condition, through an opening 118 of the cover plate 110. At its bottom side, the gear pump 108 is provided with an outflow opening 120 for dispensing liquid. The driven shaft 116 is directed such that an axial axis of this driven shaft is in the direction from the inlet 102 to the outlet 104. In this example, the housing 106a, 106b is designed so as to be substantially rotation-symmetrical about the axial axis also extending in the direction from the inlet 102 to outlet 104.

In this example, upstream of the gear pump 108, the dosing device is provided with an operating element in the form of a rotor 122, mechanically connected to the gear pump, in this example mechanically connected to the rotation axis 116. In mounted condition, this rotor 122 is located above the cover plate 110. The rotor is designed to be driven, with the aid of a changing magnetic field, for driving the gear pump 108.

In this example, it further holds that the rotor 122 is included in the liquid flow path mentioned. In this example, the rotor is provided with a permanent magnet for contactlessly driving the rotor with the aid of at least one magnetic field. In particular it holds in this example, that the rotor comprises a plurality of arms 124 extending in radial direction of the rotation axis (driving shaft 116). More in particular, only two arms are present, in line with each other, thereby forming a beam-shaped body. The extremities of the arms form poles of the permanent magnet mentioned. The poles of the permanent magnet will want to follow the changing magnetic field, causing the rotor and the driven shaft 116 to start rotating. The device described up to his point works as follows. Suppose that the inlet 102 of the dosing device is connected to a container 10 schematically shown in FIG. 3, in which an amount of mineral concentrate 4 it present. In this example, the container 10 is provided with a bag 128 formed by a flexible, sheet-shaped material in which the mineral concentrate for is included as discussed with reference to FIGS. 1 and 2 and a housing 130 in which the bag 128 is included. Preferably, the housing 130 is designed to be substantially rigid and is therefore more rigid than the bag 128. The inlet 102 of the dosing device is in fluid communication with the inside of the bag 128. By, now, generating a changing magnetic field in a predetermined manner, the rotor 122 will start to rotate in a predetermined manner. As a result, the gear pump 108 will also will start to rotate, causing the concentrate to flow via the inflow opening 112 and the space between the teeth of the gears to the outflow opening 120. Thus, the amount of concentrate which is dispensed in a dosed manner corresponds to the angle of rotation through which the rotor 122 is rotated. The connection is substantially linear.

In the outflow opening 120, further, a valve 154 can be included which opens when the fluid pressure upstream of the valve exceeds a predetermined threshold value. Here, a so-called one-way valve is involved, comprising a closing body 156 with a spring 158 which is schematically shown in this example. The valve 154 can also be designed as a so-called umbrella valve. In this example, the housing 106a and 106b is designed in a suitable plastic. The gears 114a and 114b and a driven shaft 116 are also designed in plastic. Therefore, the only metal part is the rotor 122. It is also possible that the rotor is included downstream relative to the gear pump in the liquid flow path.

For the operating element 122, designed in this example as a rotating rotor, it holds that it can be manufactured from the same material as discussed in relation to the operating element of FIGS. 1 and 2. Therefore, the operating element can be manufactured entirely from a corrosion resistant steel as discussed hereinabove. It is also possible that the operating element be manufactured from a magnetisable or magnetic material, such as for instance, soft iron, while the operating element is further provided with a corrosion resistant coating such as gold, silver and Teflon. Other corrosion resistant coatings are also conceivable. Also, the operating element can be manufactured, substantially, from a magnetisable and/or ceramic material. This also will holds for the device according to FIGS. 1 and 2.

Such variants are all understood to fall within the framework of the invention.

What is claimed is:

1. An assembly for preparing mineral water in situ, comprising:
    a container filled with a mineral concentrate; and
    a dosing device connected to a holder for dispensing the concentrate from the container in a dosed manner;
    wherein:
        the dosing device comprises:
            a housing comprising:
                an inlet,
                an outlet,
                a liquid flow path extending from the inlet to the outlet and including a pump mechanically connected to an operating element that is magnetisable or magnetic and moveably connected to the housing wherein the operating element is configured to move in response to a changing magnetic field, and
        the operating element comprises one or more of:
            a corrosion resistant steel which is at least as corrosion resistant as a corrosion resistant steel comprising molybdenum and at least one of titanium and niobium,
            a corrosion resistant coating of gold, silver or Teflon; or
            a magnetisable and/or magnetic ceramic material.

2. The assembly according to claim 1, wherein the operating element comprises a corrosion resistant steel comprising molybdenum and at least one of titanium and niobium.

3. The assembly according to claim 1, wherein the operating element comprises a corrosion resistant steel selected from the group consisting of ferritic, martensitic, or ferritic-martensitic corrosion resistant steel.

4. The assembly according to claim 2 wherein the molybdenum in the corrosion resistant steel is present from between 0.8 and 4% by weight.

5. The assembly according to claim 2 wherein the molybdenum in the corrosion resistant steel is present from between 1 and 3% by weight.

6. The assembly according to claim 2 wherein the molybdenum in the corrosion resistant steel is present from between 1.7 and 2.5% by weight.

7. The assembly according to claim 2 wherein the corrosion resistant steel comprises molybdenum and at least one of titanium and niobium, and a total amount of titanium and niobium in the corrosion resistant steel is from between 0.2 and 1.2% by weight.

8. The assembly according to claim 7 wherein the total amount of titanium and niobium in the corrosion resistant steel is between 0.3 and 1.0% by weight.

9. The assembly according to claim 7 wherein the total amount of titanium and niobium in the corrosion resistant steel is between 0.4 and 0.6% by weight.

10. The assembly according to claim 2 wherein the corrosion resistant steel is substantially nickel free.

11. The assembly according to claim 1 wherein the container and the dosing device are fixedly or detachably connected to each other.

12. The assembly according to claim 1 wherein the container is a bag-in-box container.

13. The assembly according to claim 1 wherein the operating element is included in the liquid flow path.

14. The assembly according to claim 1 wherein:
    the housing is elongated and cylindrical,
    the pump comprises:
        a bellows element compressible in an axial direction of the housing by the operating element, and expandable in an axial direction through bias, and the bellows element defines a pump volume;
        two rigid hollow cylindrical valve bodies connected to each other by means of the bellows element, supporting the bellows element radially outwards during a pumping stroke against form changes,
        an entrance in fluid communication with the inlet and the pump volume,
        a check valve, and
        an exit in fluid communication with the outlet, and the pump volume;
    the operating element being annular and connected to the housing so as to be movable in the axial direction for compressing the bellows element in the axial direction.

15. The assembly according to claim 14, wherein the rigid hollow, cylindrical valve bodies are configured to abut against each other at the end of the pumping stroke.

16. An assembly for preparing mineral water in situ, comprising:
    a container filled with a mineral concentrate; and
    a dosing device connected to a holder for dispensing the concentrate from the container in a dosed manner;
    wherein:
        the dosing device comprises:
            a housing comprising:
                an inlet;
                an outlet;
                a liquid flow path extending from the inlet to the outlet and including a pump mechanically connected to an operating element that is magnetisable or magnetic, moveably connected to the housing, and configured to move in response to a changing magnetic field;

the operating element comprises one or more of:
  a corrosion resistant steel which is at least as corrosion resistant as a corrosion resistant steel comprising molybdenum and at least one of titanium and niobium,
  a corrosion resistant coating of gold, silver or Teflon; or
  a magnetisable and/or magnetic ceramic material; and
the operating element further comprises a rotor connected to the housing so as to be rotatable about a rotation axis in the presence of a changing magnet field, and the rotor is mechanically connected to the pump.

17. The assembly according to claim 16, wherein the rotor is included in the liquid flow path upstream of the pump.

18. The assembly according to claim 17 wherein the concentrate comprises a total salt concentration of at least 5, and not more than 50 g per liter.

19. The assembly according to claim 18, wherein the concentrate is electrically neutral and comprises: from 0.1 to 273 g of calcium ions per liter, from 0.1 to 200 g of magnesium irons per liter, from 0.1 to 583 g of chloride ions per liter, and from 0.1 to 276 g of sulphate ions per liter, in mutual ratios.

20. The assembly according to claim 18 wherein the concentrate has a pH in the range of 1-5.

21. A dosing device for dispensing a fluid from a container in a dosed manner comprising:
  a housing comprising:
    an inlet;
    an outlet;
    a liquid flow path, extending from the inlet to the outlet and comprising:
      a pump; and
      a magnetisable or magnetic operating element, connected to the housing and moveable in a changing magnetic field,
  wherein:
    the operating element is mechanically connected to the pump;
    the operating element comprises:
      a corrosion resistant steel which is at least as corrosion resistant as a corrosion resistant steel comprising molybdenum and at least one of titanium and niobium; or
      a corrosion resistant coating such as gold, silver or Teflon;
    the operating element is provided with a rotor connected to the housing and rotatable about a rotation axis in a changing magnetic field; and
    the rotor is mechanically connected to the pump.

22. The dosing device according to claim 21 wherein the rotor is included in the liquid flow path upstream of the pump.

* * * * *